US009100273B2

(12) United States Patent
Azizi et al.

(10) Patent No.: US 9,100,273 B2
(45) Date of Patent: Aug. 4, 2015

(54) CALENDAR-AWARE DEVICES

(75) Inventors: Shahrnaz Azizi, Cupertino, CA (US); Shantidev Mohanty, Santa Clara, CA (US); Pouya Taaghol, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 13/553,961

(22) Filed: Jul. 20, 2012

(65) Prior Publication Data

US 2014/0025799 A1    Jan. 23, 2014

(51) Int. Cl.
| | |
|---|---|
| G06F 15/173 | (2006.01) |
| H04L 12/24 | (2006.01) |
| H04W 4/02 | (2009.01) |
| H04L 29/08 | (2006.01) |
| G06F 9/00 | (2006.01) |
| H04M 1/00 | (2006.01) |

(Continued)

(52) U.S. Cl.
CPC *H04L 41/00* (2013.01); *G06F 9/00* (2013.01); *G06Q 10/109* (2013.01); *H04L 67/06* (2013.01); *H04L 67/306* (2013.01); *H04M 1/00* (2013.01); *H04W 4/023* (2013.01); *H04W 76/00* (2013.01)

(58) Field of Classification Search
CPC ......... H04L 29/06; H04L 41/22; H04L 41/12; H04L 12/24
USPC ........................................................ 709/223
See application file for complete search history.

(56) References Cited

U.S. PATENT DOCUMENTS

| | | | |
|---|---|---|---|
| 7,639,943 B1 * | 12/2009 | Kalajan ......................... | 396/429 |
| 2006/0253866 A1 * | 11/2006 | Curcio et al. ................... | 725/40 |

(Continued)

FOREIGN PATENT DOCUMENTS

WO    2014/014588 A1    1/2014

OTHER PUBLICATIONS

International Search Report and Written Opinion Received for Patent Application No. PCT/US2013/045827, mailed on Sep. 25, 2013, 14 pages.

(Continued)

*Primary Examiner* — Tauqir Hussain
(74) *Attorney, Agent, or Firm* — Alpine Technology Law Group LLC

(57) ABSTRACT

A client-server session is automatically initiated between a client-type device an a cloud-based server in a cloud-based computing environment based on user-defined parameters, thereby providing convenience and ease of use for a user for uploading, sharing and downloading media content to and from a content-sharing website. A user-preference database stores user-preference information, such as information relating to media-content-type information, media-content-source information, media-content-destination information, user-uploading-preference information, and/or uplink-network-preference and downlink-network-preference information. A rule is generated for uploading and/or downloading a designated media-content type to the content-sharing website based on the stored user preference information and at least one calendar event available from a calendar application. An event trigger signal is generated if the conditions of the rule are satisfied, and a communication controller then establishes a communication link to the content-sharing website and uploads and/or downloads the designated media content.

26 Claims, 9 Drawing Sheets

(51) Int. Cl.
*H04W 76/00* (2009.01)
*G06Q 10/10* (2012.01)

(56) References Cited

U.S. PATENT DOCUMENTS

| | | |
|---|---|---|
| 2007/0008321 A1 | 1/2007 | Gallagher et al. |
| 2008/0059618 A1* | 3/2008 | May et al. ............... 709/223 |
| 2010/0198944 A1 | 8/2010 | Ho et al. |
| 2012/0066602 A1* | 3/2012 | Chai et al. .............. 715/733 |
| 2012/0079078 A1* | 3/2012 | Karaoguz et al. ......... 709/219 |

OTHER PUBLICATIONS

International Preliminary Report on Patentability received for International Application No. PCT/US2013/045827, mailed on Jan. 29, 2015.

* cited by examiner

CALENDAR-AWARE DEVICES

TECHNICAL FIELD

Embodiments described herein are generally directed to the field of wireless communications.

BACKGROUND ART

In a conventional cloud-based computing environment, the paradigm used is a client-server model, and a connection to a cloud-based server is always initiated by a client-type device. Moreover, in most cases, user intervention is a necessary aspect for initiating a connection from the client-type device to the cloud-based server. For example, if a user desires to upload photos to a photo-sharing website, the user logs into an account on the photo-sharing website to initiate a connection to the cloud-based server. After a successful login, the photos are then uploaded.

The conventional client-server model in a conventional cloud-based computing environment has the drawback that a user must affirmatively initiate a client-server session. For example, suppose that a celebration event is scheduled on a user's calendar running on a user's smart-type device, such as a smartphone. The e-invitation to the celebration event received by the user contained a link to a website where the user can download details about the celebration, such as other invitees, the invitees attending, and a link to a folder for uploading photos that is located on a cloud-based server. Suppose the user attends the celebration, takes photos and videos using a smartphone, and then would like to upload the photos and videos to the folder on the cloud-based server. Conventionally, user interaction with a client-type smart-type device would be necessary initiate the photo upload to the cloud-based server. Thus, for this exemplary scenario, if the user wants to upload the pictures taken using a smartphone during an event scheduled on the user's calendar, then the user has to affirmatively initiate connection to the photo-sharing server after the event is oven. After successful connection to the cloud-based server, the photos and videos are uploaded from the smartphone to the server.

A system and a technique are needed to automatically initiating a client-server session in a cloud-based computing environment based on user defined parameters. Further, a system and a technique are needed to automatically upload and share the media-content among client-servers based on user defined parameters.

BRIEF DESCRIPTION OF THE DRAWINGS

Embodiments disclosed herein are illustrated by way of example, and not by way of limitation, in the figures of the accompanying drawings in which like reference numerals refer to similar elements and in which.

Figure 1A:
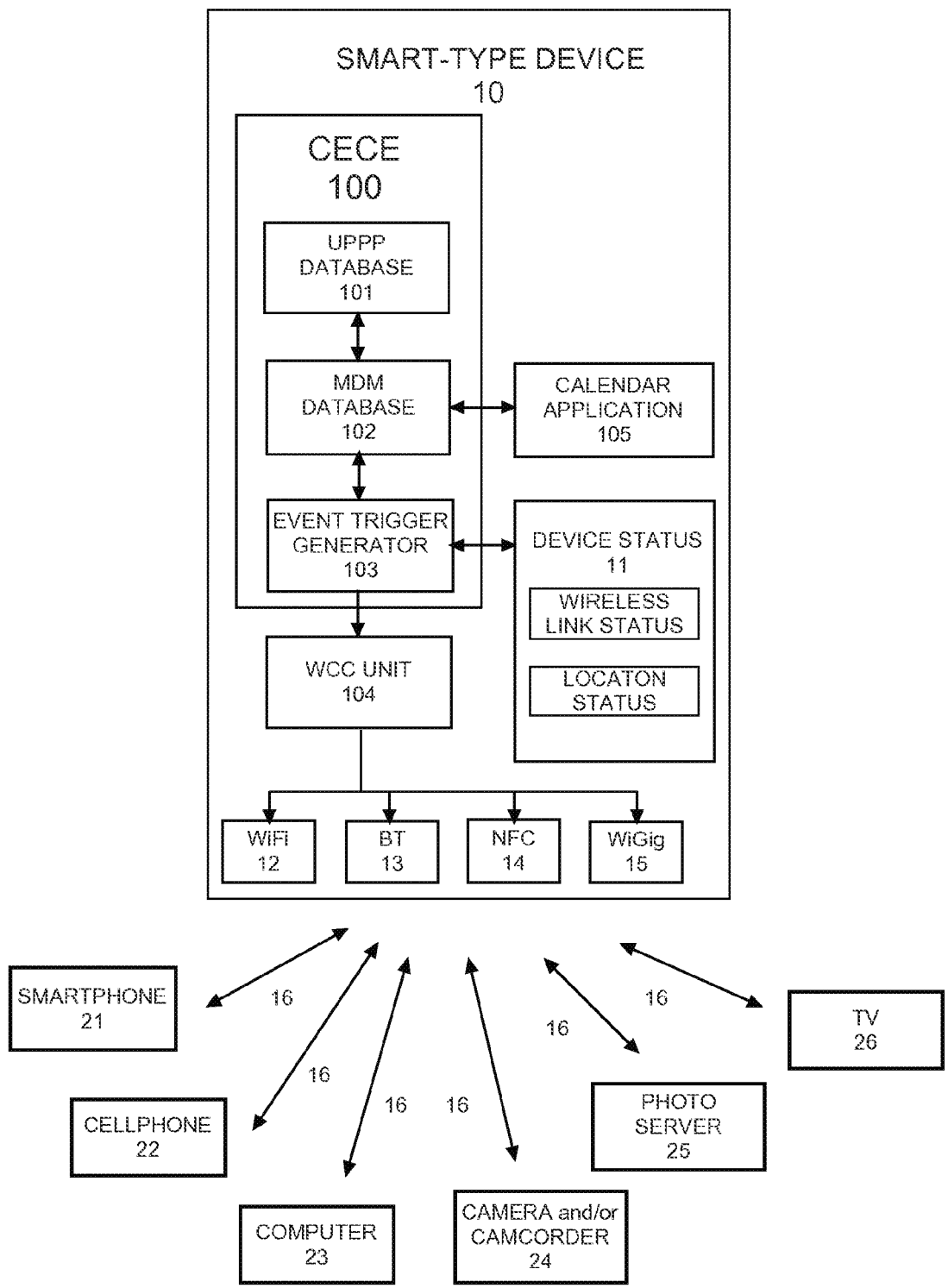
FIG. 1A depicts a functional block diagram of an exemplary embodiment of a Calendar and Event Coordination Engine (CECE) according to the subject matter disclosed herein.

It will be appreciated that for simplicity and/or clarity of illustration, elements depicted in the figures have not necessarily been drawn to scale. For example, the dimensions of some of the elements may be exaggerated relative to other elements for clarity. The scaling of the figures does not represent precise dimensions and/or dimensional ratios of the various elements depicted herein. Further, if considered appropriate, reference numerals have been repealed among the figures to indicate corresponding and/or analogous elements.

DESCRIPTION OF THE EMBODIMENTS

Embodiments of described herein relate to a system and a method for automatically initiating a client-server session in a cloud-based computing environment based on user-defined parameters. In the following description, numerous specific details are set forth to provide a thorough understanding of embodiments disclosed herein. One skilled in the relevant art will recognize, however, that the embodiments disclosed herein can be practiced without one or more of the specific details, or with other methods, components, materials, and so forth. In other instances, well-known structures, materials, or operations are not shown or described in detail to avoid obscuring aspects of the specification.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration," Any embodiment described herein as "exemplary" is not to be construed as necessarily preferred or advantageous over other embodiments.

Various operations may be described as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

The subject matter disclosed herein provides a system and technique for automatically initiating a client-server session in a cloud-based computing environment based on user-defined parameters. Moreover, the subject matter disclosed herein provides a system and a method for accomplishing automatic upload of media content from a client-type device to a cloud-based server without being directly initiated by a user, thereby providing ease of use, saving time, and an improved user experience. Further, the subject matter disclosed herein provides a system and technique to automatically share the media-content among client-servers based on user defined parameters. In one exemplary embodiment, the subject matter disclosed herein provides a calendar-event-aware smart-type device that can automatically upload information, such as media content and/or location data, to a cloud-based server or other designated device based on rules that are generated based on user preferences.

Figure 1B:
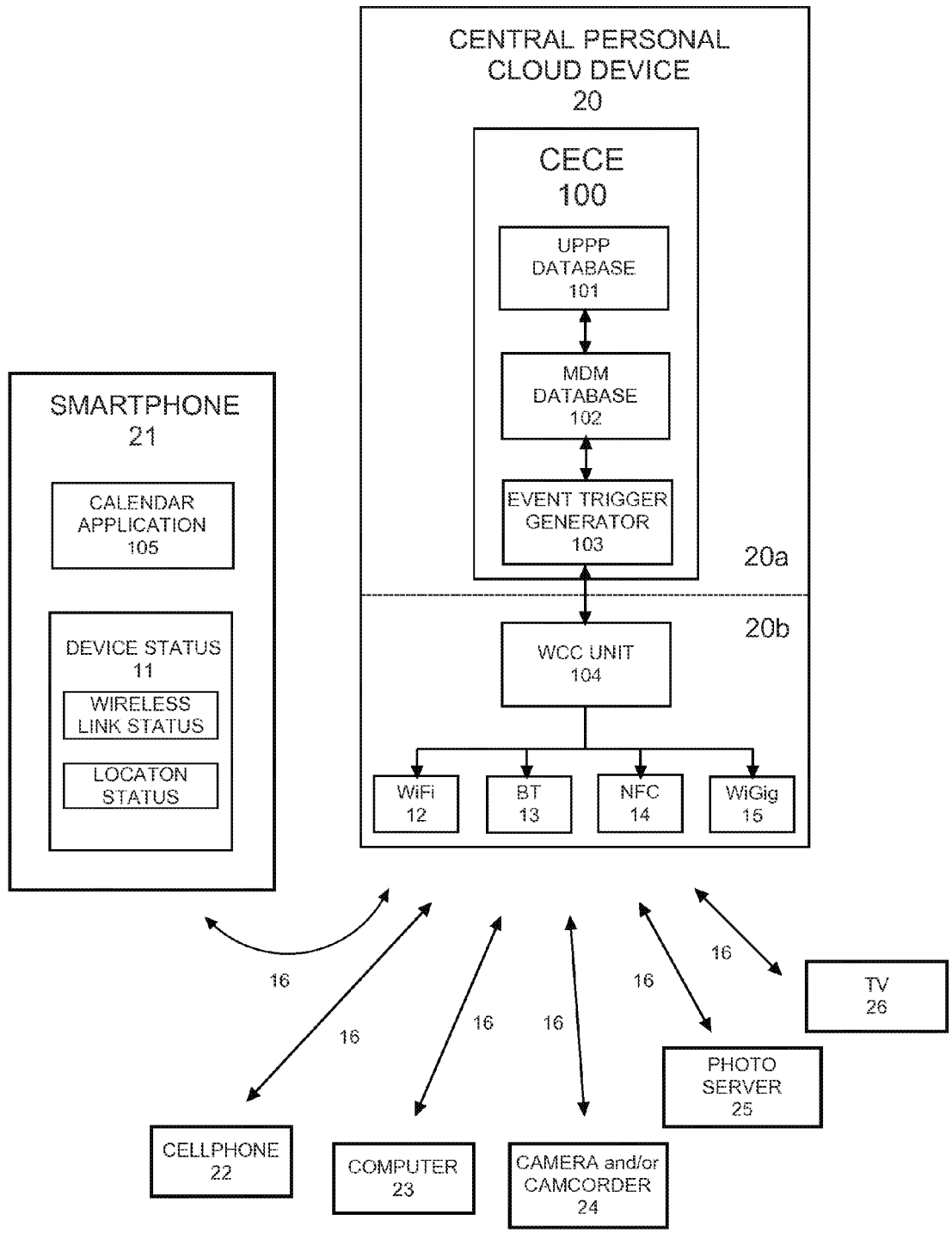
FIG. 1B depicts a functional block diagram of another exemplary embodiment of a CECE contained in a central personal cloud device according to the subject matter disclosed herein.

FIG. 1A depicts a functional block diagram of an exemplary embodiment of a Calendar and Event Coordination Engine (CECE) 100 contained in a smart-type device 10 according to the subject matter disclosed herein. Smart-type device 10 comprises, for example, but is not limited to, a smartphone, a pad-type device, an ultrabook, a subscriber station (SS) (see FIG. 3), customer-premises equipment (CPE) (see FIG. 3), a UE (see FIG. 4), and/or an information-handling system (see FIGS. 7 and 8). FIG. 1B depicts a functional block diagram of another exemplary embodiment of a CECE 100 contained in a central personal cloud device 20 according to the subject matter disclosed herein. Central personal cloud device 20 can comprises a stand-alone device that is part of a Local Area Network (LAN), a wireless LAN (WLAN), a Personal Area Network (PAN). In one exemplary embodiment, cloud device 20 could be part of a remotely located server-type device, such as a cloud-based server.

For an exemplary embodiment in which CECE 100 is contained in a smart-type device 10, CECE 100 comprises a User Preference and Permission Profile (UPPP) database 101, a Matching and Decision Making (MDM) database 102, an Event Trigger Generator 103, and a Wireless Communications Control (WCC) unit 104. In one exemplary configuration, CECE 100 comprises the various components comprising information-handling system 600, in FIG. 6. In another exemplary configuration, CECE can comprise one or more an application-specific integrated circuit in a smart-type device that provides the capability for automatically initiating a client-server session in a cloud-based computing environment based on user-defined parameters. In yet another exemplary configuration, the one or more aspects of the functionality of CECE 100 is provided by computer-readable instructions stored in a non-transitory storage medium.

UPPP 101 stores user preference and permission information. In one exemplary embodiment, user preference and permission information comprises, but is not limited to, information relating to media-content-type information; media-content-source information; media-content-destination information, such as, user account and credential information; user content uplink and downlink preference information, and user uplink- and downlink-network-preference information. For example, UPPP 101 stores media-content-source address information identifying each source directory containing media-content-type information, such as photos and videos; content-destination information, such as a user name, a password, a cloud-based network address, and other protocol information for a photo- and video-sharing website; user uploading-preference information indicating that upload events to the photo- and video-sharing website are to occur in a specified temporal relationship with selected calendar events; user downloading-preference information indicating that download events from the photo- and video-sharing website are to occur in a specified temporal relation with selected calendar events; and user uplink-network-preference and user downlink-network-preference information indicating that uploads and downloads to and from the photo- and video-sharing website are to occur over a particular type of network, such as a free wireless (i.e., a home WiFi network) as opposed to a fee-based wireless link, such as a 3G/4G network. User preference and permission information for other types of media content, such as, but not limited to, text-based, image-based and/or audio-based content, could also be stored in UPPP 101. It should also be understood that information relating to user-uplink-network preference and/or user-downlink network preference could include information relating to a fee-based wireless link, and/or different content-based cost thresholds for wireless links.

MDM database 102 generates rules based on information contained in PPPU 101 and events stored in a calendar application 105. For example, suppose that there is a calendar event stored in a calendar application on a user's smart-type device having an event name of "Kid's Soccer Match" along with a designated time and a designated geographic location of the event, for example, a soccer match at 10 a.m. on Jun. 23, 2012, in Monta Vista High School, Cupertino, Calif. Suppose further that information contained in UPPP 101 indicates that photos and/or videos are to be automatically uploaded to user's photo- and video-sharing website account when there is an available connection to the photo- and video-sharing website meeting a designated cost threshold. The rule generator of MDM database infers that photos and/or videos may be taken during the scheduled match, and if such photos and/or videos are available in the indicated content-source location(s) in a designated temporal relationship with the scheduled match (i.e., within a window of time after the event begins), then the photos and/or videos should be automatically uploaded to user's photo- and video-sharing website account. Based on this identified inference, the rule generator of MDM database 102 generates an exemplary rule that is stored in MDM database 102, such as "if photos and/or videos are taken within a designated window of time of the scheduled soccer match and the smart-type device is connected to network meeting a designated cost threshold, then automatically upload the photos and/or videos to the photo- and video-sharing website."

In one exemplary embodiment, information relating to the specified time window and the specified network cost threshold is manually selected by the user and stored in UPPP 101 during a system setup phase. In another exemplary embodiment, such temporal and network cost threshold information may be a default-type setting that is not selectable and/or adjustable by a user.

The Event Trigger Generator (ETG) 103 determines whether there are any unexecuted rules stored in MDM database 102. If MDM database 102 is empty, then ETG 103 takes no action. In one exemplary embodiment, if MDM database 102 contains one or more unexecuted rules, then ETG 103 determines the device status 11 that should be monitored, such as, but not limited to, time and date conditions, whether designated type of media content is in designated location(s), and whether there is appropriate network connectivity. If all or a user-defined subset of the conditions of a particular rule are satisfied, ETG 103 generates a trigger event signal to trigger the action associated with the rule, such as uploading of the designated media content. (A user-defined subset of the conditions that satisfy a particular rule allows flexibility for situations in which a scheduled time or location of a calendar event changes at the last minute.) The trigger event signal is communicated in a well-known manner to a Wireless Communication Controller (WCC) unit 104. In response, WCC 104 establishes a wireless link using an appropriate radio interfaces, such as, but not limited to, WiFi 12, Bluetooth (BT) 13, Near Field Communications (NFC) 14, WiGig 15, ZigBee, wired (i.e., Ethernet (not shown)), etc., to complete the intended action, such as uploading and/or controlling uploading of the designated media content. Access to a cloud-based server may be obtained in a well-known manner through a wireless link to a wireless network (not depicted in FIG. 1A) and/or in a well-known manner through a wired link, such as a LAN (also not depicted in FIG. 1A) through one or more communication networks to the cloud-based server.

In another exemplary embodiment, smart-type device 10 includes a location-determination capability 16, such as GPS or other well-known location-determining-type functionality, in which case UPPP 101 provides a user with the ability to designate location information as part of preference information, such as a physical proximity parameter for a location associated with a calendar event and identified by the rule generator of MDM database 102. Accordingly, the exemplary rule generated for the previous example of a soccer match event would be generated as "if photos and/or videos are taken within a designated window of time of the scheduled soccer match, and the photos and/or videos include location information that is within the proximity threshold and the smart-type device is connected to network meeting a designated cost threshold, then automatically upload the photos and/or videos to the photo- and video-sharing website." In one exemplary embodiment, the location of the soccer match event is included as part of the calendar entry, such as the name of the location (i.e., Monta Vista High School, Cupertino, Calif.), with which CECE 100 is able to determine location information, such as GPS coordinates, etc.

For this exemplary embodiment, ETG 103 similarly determines whether there are any unexecuted rules stored in MDM database 102. If MDM database 102 is empty, ETG 103 takes no action. If MDM database 102 contains one or more unexecuted rules, then ETG 103 determines the device status 11 that should be monitored, which, for this exemplary embodiment, would include physical location information in addition to the other previously mentioned device conditions. If all or a user-defined subset of the conditions of a particular rule are satisfied, ETG 103 generates a trigger event signal to trigger the action associated with the rule, such as uploading of the designated media content. The trigger event signal is communicated to WCC unit 104 in a well-known manner, which establishes a wireless link 16 using an appropriate radio interface to complete the intended action, such as uploading and/or controlling uploading of the designated media content.

In one exemplary embodiment, a user can designate media-content-source information for locations that are remote from smart-type device 10. That is, a user can designate media-content sources that are located in other devices, smart-type devices and/or Wake-On-LAN (WOL) devices. For example, a user can designate one or more smartphone devices 21 as locations for ETG 103 to monitor for designated type of media-content for uploading. ETG 103 interfaces with WCC unit 104, which establishes a wireless link using an appropriate radio interface to determine whether a designated type of media-content is available for uploading to a content-sharing server. According to the subject matter disclosed herein, media-content source locations are not restricted to smart-type devices and/or calendar-aware devices. For example, a media-content source location could be one or more cellphones 22 in which the media-content includes time-stamp information so that ETG 103 is able to determine whether a rule has been satisfied and an upload action should be taken. Yet another exemplary media-content source location could be one or more computers 23, one or more cameras and/or camcorders 24 having a wireless link capability, and one or more photo servers 25.

Additionally, a user can designate that one or more calendar applications for which MDM database generates rules can be remotely located from smart-type device 10. For example, a user can designate that the calendar applications on, but not limited to, smartphone devices 21 and 22 include calendar events for which rules are generated.

In one exemplary embodiment, user-preference information can indicate that designated content be presented either before or after uploading to a content-sharing website, thereby allowing the presented content to be further designated in some manner, such as by, but not limited to, selecting for transferring to another designated location or for deletion. Exemplary other designated locations that the presented content can be transferred to can include, and are not limited to, another smartphone device 21 and/or 22, computer 23 and photoserver 25. For example, suppose the earlier example of a soccer match event included a situation in which several people attended the soccer match event and took photos. Suppose further that user-preference information stored in UPPP database 101 indicated that the smartphones and/or cameras of the several people attending the soccer match are designated content-source locations for the calendar event. When the conditions of the rule for the soccer match event are satisfied, ETG 103 triggers an event in which WCC unit 104 establishes communication links to each of the designated content-source locations and uploads and/or controls uploading of the designated content to the designated content-destination. Depending on the user-preference information, the uploaded content is then downloaded and presented on, for example, TV 20. Suppose the several people attending the soccer match gather at a residence for a get together. They would then be able to view the photos from all of the designated content-source locations, and would be able to select particular photos to downloading to other devices, such as their personal computers (PCs), etc. It should be understood the physical location of a designated media-content source need not be in close physical proximity to smart-type device 10, but can be remotely located and accessible through one or more communication networks in a well-known manner.

For an exemplary embodiment in which CECE 100 is contained in a central personal cloud device 20, such as that depicted in FIG. 1B, event information in a calendar application and device status information is remotely located from CECE 100. User preference information stored in UPPP database 101 would include location information for designating one or more calendar applications and for obtaining device status from one or more designated devices. For example, central personal cloud device 20 could be physically located as part of a LAN or PAN of a user, in which case UPPP database 101 contains information that designates calendar application 105 of smartphone 21 for calendar events, and also designates the device status 11 of smartphone 21 for determining whether rule conditions are satisfied. In another exemplary embodiment, UPPP database 101 contains information that designates more than one calendar applications at different designated locations, and designates the device status of more than one designated devices. In one exemplary embodiment, a portion 20*a* of central personal cloud device 20 could be remotely located from portion 20*b*, which includes WCC unit 104. In another exemplary embodiment, one or more portions of central personal cloud device 20 could be located at a cloud-based server.

It should be understood that although described in the context of smart-type devices, the subject matter disclosed herein is applicable to any type of event, including workplace meetings in which meeting minutes taken during a meeting on a notebook (i.e., text-based content) can automatically be uploaded to the share-site of the meeting.

In yet another exemplary embodiment, location information of the smart-type device is automatically uploaded to, for example, a vehicle navigation system. For example, a schedule-event-aware smart-type device 100 determines that an event is scheduled at a destination address that does not match the current location of the smart-type device. MDM database 102 would generate a rule in which smart-type device 100 monitors for a wireless interface for a vehicle navigation system. If smart-type device 100 detects a wireless interface of the vehicle navigation system, the destination address is uploaded to the navigation system so that the destination location is displayed on the navigation system; consequently, the user would not need to look at smart-type device 100 while driving.

Figure 2:
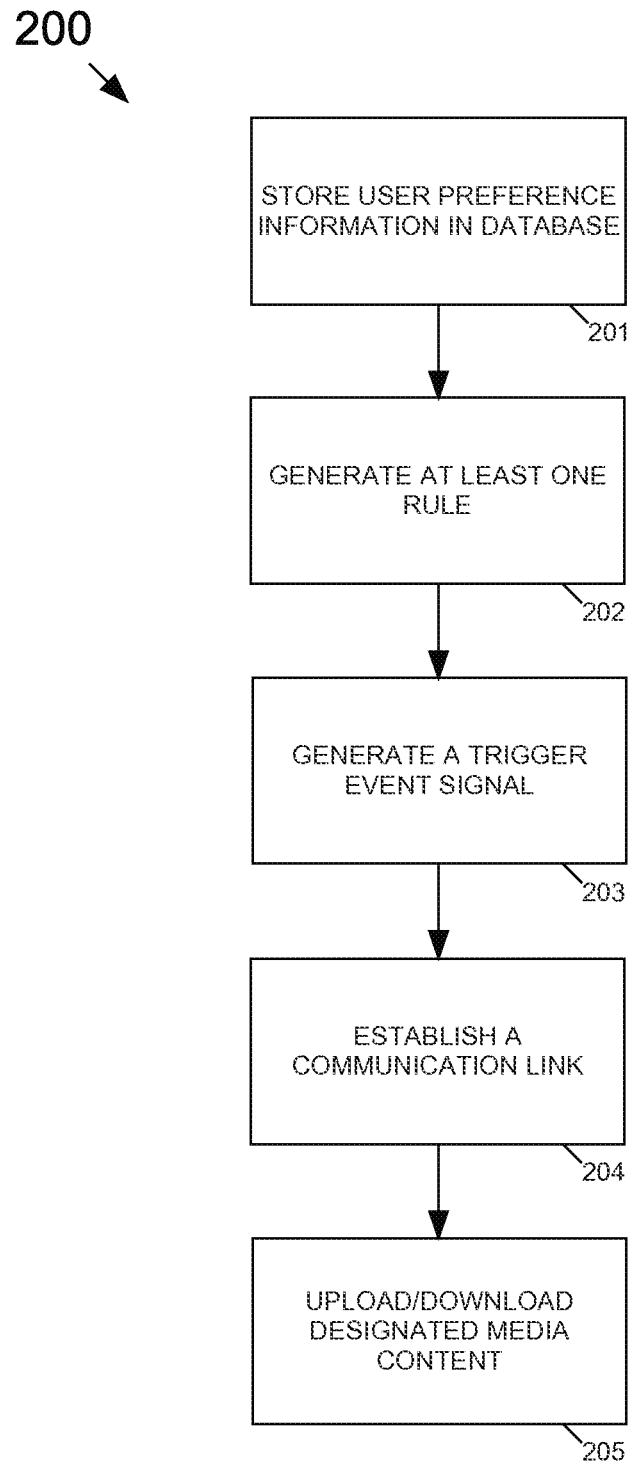
FIG. 2 depicts an exemplary embodiment of a flow diagram for automatically initiating a client-server session in a cloud-based computing environment based on user-defined parameters according to the subject matter disclosed herein.

FIG. 2 depicts an exemplary embodiment of a flow diagram 200 for automatically initiating a client-server session in a cloud-based computing environment based on user-defined parameters according to the subject matter disclosed herein. At 201, user-preference information is stored in UPPP database 101. In one exemplary embodiment, the user preference information comprises media-content-type information; media-content-source information; media-content-destination information, such as, user account and credential information; user content uplink and downlink preference information, and user uplink- and downlink-network-preference information. In one exemplary embodiment, the media-content-type information comprises information relating to photo-based media, video-based media, image-based media, text-based media, or audio-based media, or combinations thereof. In one exemplary embodiment, the user-uploading preference information comprises information relating to at least one cloud-based media-content-sharing server, and user-downloading preference information comprises information relating to at least one destination to which designated content is to be transferred. In one exemplary embodiment, the media-content-source information comprises information relating to at least one source location that is local to smart-type device 100, or a source location that is remote from smart-type device 100, or a combination thereof. In one exemplary embodiment, the uplink-network-preference information comprises cost threshold information for selecting an uplink network. In one exemplary embodiment, the uplink-network-preference information designates a Bluetooth-based network, an IEEE 802.11-based network, an IEEE 802.16-based network, an IEEE 802.18-based wireless network, a 3GPP-based protocol wireless network, a Third Generation Partnership Project Long Term Evolution (3GPP LTE) based wireless network, a 3GPP2 Air Interface Evolution (3GPP2 AIE) based wireless network, a UMTS-based protocol wireless, a CDMA2000-based protocol wireless, a GSM-based protocol wireless, a cellular-digital-packet-data-based (CDPD-based) protocol wireless network, a Mobitex-based protocol wireless network, a Near-Field-Communications-based (NFC-based) link, a WiGig-based network, or a ZigBee-based network, or combinations thereof.

At 202, at least one rule is generated for uploading and/or downloading at least one media-content type to at least one media-content destination. In one exemplary embodiment, the at least one rule identifies at least one condition to be satisfied before uploading the at least one media-content type to the at least one cloud-based media-content-sharing server and is based on the stored user preference information and at least one calendar event available to the rule generator from at least one calendar application. In one exemplary embodiment, the at least one calendar application is local to smart-type device 100, or is remote from smart-type device 100, or a combination thereof. In one exemplary embodiment, smart-type device 100 is capable of determine its location, such as by comprising a GPS functionality, in which case the at least one rule is further based on a determined location of smart-type device 100.

At 203, an event trigger signal is generated if the at least one condition of the at least one rule has been satisfied. At 204, a communication link is established to the at least one designated media-content destination based on uplink-network-preference and/or downlink-network-preference information stored in the user-preference database. At 205, the at least one media-content type corresponding to the at least one rule is uploaded to and/or downloaded from the at least one cloud-based media-content-sharing server.

Figure 3:
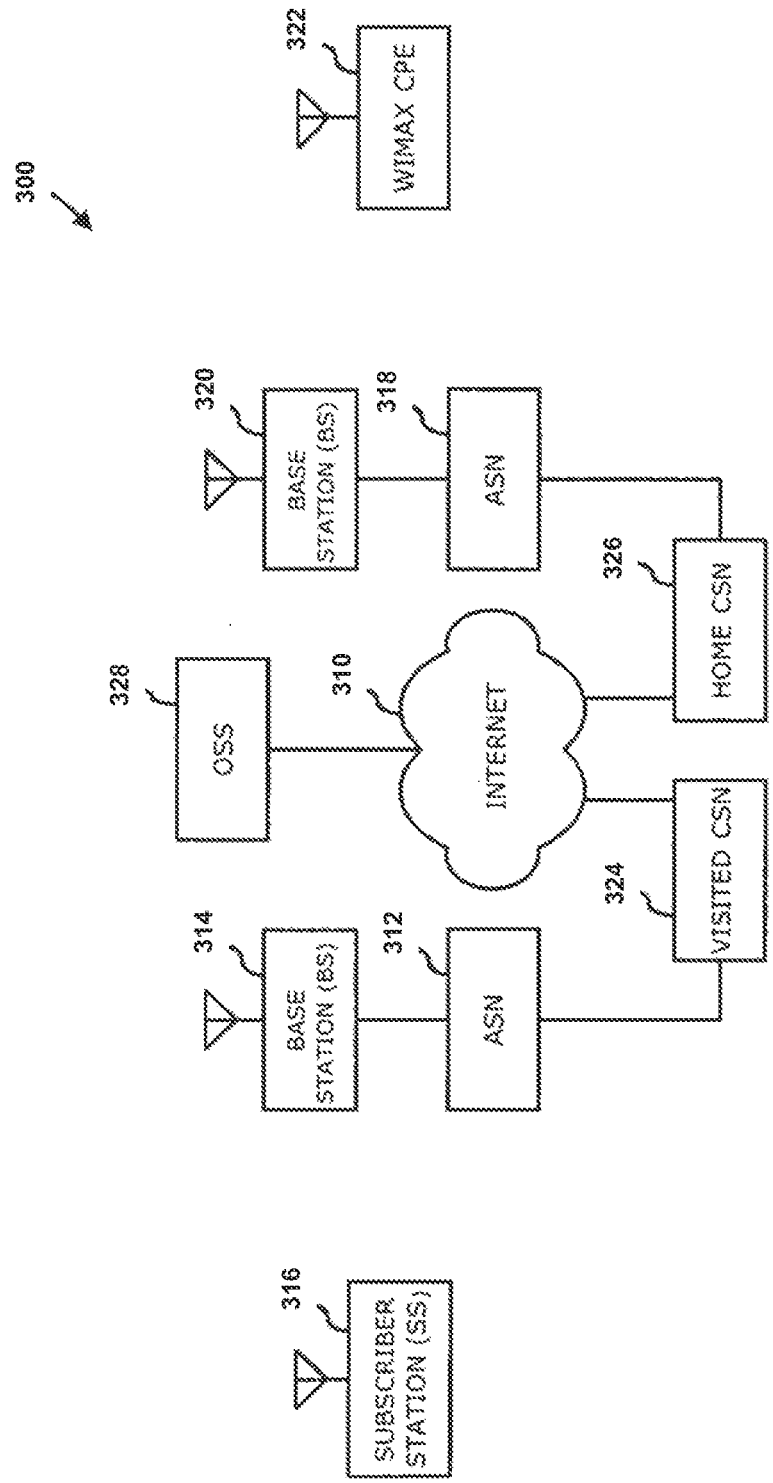
FIG. 3 depicts a block diagram of an exemplary configuration of a wireless network in accordance with one or more exemplary embodiments disclosed herein.

FIG. 3 depicts a block diagram of an exemplary configuration of a wireless network 300 in accordance with one or more exemplary embodiments disclosed herein. One or more of the elements of wireless network 300 may be capable of automatically initiating a client-server session in a cloud-based computing environment based on user-defined parameters according to the subject matter disclosed herein. As shown in FIG. 3, network 300 may be an Internet-Protocol-type (IP-type) network comprising an Internet-type network 310, or the like, that is capable of supporting mobile wireless access and/or fixed wireless access to Internet 310. In one or more exemplary embodiments, network 300 may be in compliance with a Worldwide Interoperability for Microwave Access (WiMAX) standard or future generations of WiMAX, and in one particular embodiment may be in compliance with an institute for Electrical and Electronics Engineers 802.16-based standard (for example, IEEE 802.16e), or an IEEE 802.11-based standard (for example, IEEE 802.11 a/b/g/n standard), and so on. In one or more alternative exemplary embodiments, network 300 may be in compliance with a Third Generation Partnership Project Long Term Evolution (3GPP LTE) or a 3GPP2 Air Interface Evolution (3GPP2 AIE) standard. In general, network 300 may comprise any type of orthogonal-frequency-division-multiple-access-based (OFDMA-based) wireless network, for example, a WiMAX compliant network, a Wi-Fi Alliance Compliant Network, a digital subscriber-line-type (DSL-type) network, an asymmetric-digital-subscriber-line-type (ADSL-type) network, an Ultra-Wideband (UWB) compliant network, a Wireless Universal Serial Bus (USB) compliant network, a 4th Generation (4G) type network, and so on, and the scope of the claimed subject matter is not limited in these respects. As an example of mobile wireless access, access service network (ASN) 312 is capable of coupling with base station (BS) 314 to provide wireless communication between subscriber station (SS) 316 (also referred to herein as a wireless terminal) and Internet 310. In one exemplary embodiment, subscriber station 316 may comprise a mobile-type device or information-handling system capable of wirelessly communicating via network 300, for example, a notebook-type computer, a cellular telephone, a personal digital assistant, an M2M-type device, or the like. In another exemplary embodiment, subscriber station is capable of automatically initiating a client-server session in a cloud-based computing environment based on user-defined parameters according to the subject matter disclosed herein. ASN 312 may implement profiles that are capable of defining the mapping of network functions to one or more physical entities on network 300. Base station 314 may comprise radio equipment to provide radio-frequency (RF) communication with subscriber station 316, and may comprise, for example, the physical layer (PHY) and media access control (MAC) layer equipment in compliance with an IEEE 802.16e-type standard. Base station 314 may further comprise an IP backplane to couple to Internet 310 via ASN 312, although the scope of the claimed subject matter is not limited in these respects.

Network 300 may further comprise a visited connectivity service network (CSN) 324 capable of providing one or more network functions including, but not limited to, proxy and/or relay type functions, for example, authentication, authorization and accounting (AAA) functions, dynamic host configuration protocol (DHCP) functions, or domain-name service controls or the like, domain gateways, such as public switched telephone network (PSTN) gateways or Voice over Internet Protocol (VoIP) gateways, and/or Internet-Protocol-type (IP-type) server functions, or the like. These are, however, merely example of the types of functions that are capable of being provided by visited CSN or home CSN 326, and the scope of the claimed subject matter is not limited in these respects. Visited CSN 324 may be referred to as a visited CSN in the case, for example, in which visited CSN 324 is not part of the regular service provider of subscriber station 316, for example, in which subscriber station 316 is roaming away from its home CSN, such as home CSN 326, or, for example, in which network 300 is part of the regular service provider of subscriber station, but in which network 300 may be in another location or state that is not the main or home location of subscriber station 316. In a fixed wireless arrangement, WiMAX-type customer premises equipment (CPE) 322 may be located in a home or business to provide home or business customer broadband access to Internet 310 via base station 320, ASN 318, and home CSN 326 in a manner similar to access by subscriber station 316 via base station 314, ASN 312, and visited CSN 324, a difference being that WiMAX CPE 322 is generally disposed in a stationary location, although it may be moved to different locations as needed, whereas subscriber station may be utilized at one or more locations if subscriber station 316 is within range of base station 314 for example. It should be noted that CPE 322 need not necessarily comprise a WiMAX-type terminal, and may comprise other types of terminals or devices compliant with one or more standards or protocols, for example, as discussed herein, and in general may comprise a fixed or a mobile device. Moreover, in one exemplary embodiment, CPE 322 is capable of automatically initiating a client-server session in a cloud-based computing environment based on user-defined parameters according to the subject matter disclosed herein. In accordance with one or more embodiments, operation support system (OSS) 328 may be part of network 300 to provide management functions for network 300 and to provide interfaces between functional entities of network 300. Network 300 of FIG. 3 is merely one type of wireless network showing a certain number of the components of network 300; however, the scope of the claimed subject matter is not limited in these respects.

Figure 4:
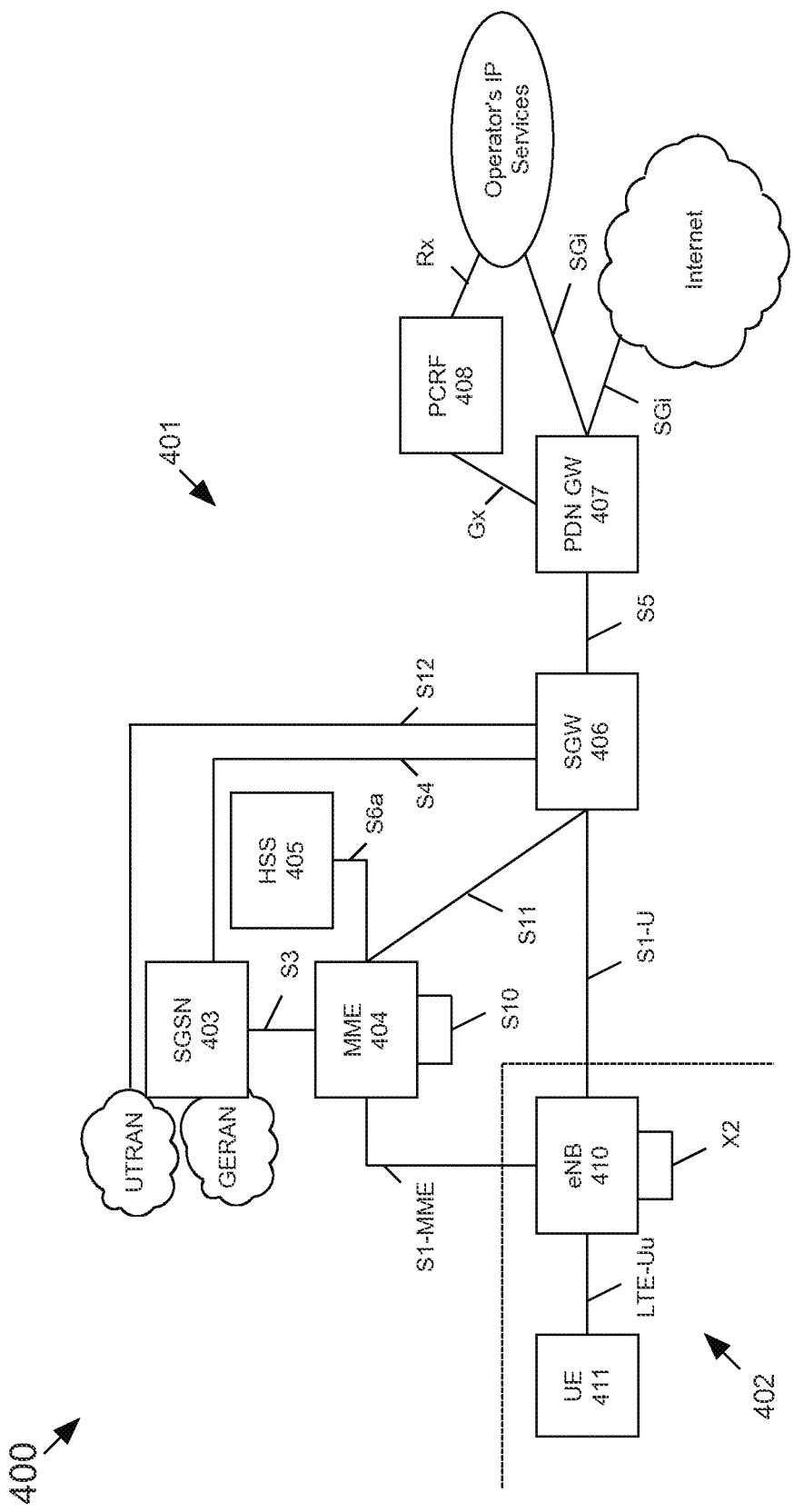
FIG. 4 shows an exemplary block diagram of the overall architecture of a 3GPP LTE network that includes one or more devices that are capable of automatically initiating a client-server session in a cloud-based computing environment based on user-defined parameters according to the subject matter disclosed herein.

FIG. 4 shows an exemplary block diagram of the overall architecture of a 3GPP LTE network 400 that includes one or more devices that are capable of automatically initiating a client-server session in a cloud-based computing environment based on user-defined parameters according to the subject matter disclosed herein. FIG. 4 also generally shows exemplary network elements and exemplary standardized interfaces. At a high level, network 400 comprises a core network (CN) 401 (also referred to as an evolved Packet System (EPC)), and an air-interface access network E-UTRAN 302. CN 401 is responsible for the overall control of the various User Equipment (UE) connected to the network and establishment of the bearers. CN 401 may include functional entities, such as a home agent HA and/or an ANDSF server or entity, although not explicitly depicted. E-UTRAN 402 is responsible for all radio-related functions.

The main exemplary logical nodes of CN 401 include, but are not limited to, a Serving GPRS Support Node 403, the Mobility Management Entity 404, a Home Subscriber Server (HSS) 405, a Serving Gate (SGW) 406, a PDN Gateway 407 and a Policy and Charging Rules Function (PCRF) Manager 408. The functionality of each of the network elements of CN 301 is well known and is not described herein. Each of the network elements of CN 401 are interconnected by well-known exemplary standardized interfaces, some of which are indicated in FIG. 4, such as interfaces S3, S4, S5, etc., although not described herein.

While CN 401 includes many logical nodes, the E-UTRAN access network 402 is formed by one node, the evolved NodeB (base station (BS), eNB or eNodeB) 410, which connects to one or more User Equipment (UE) 411, of which only one is depicted in FIG. 4. UE 411 is also referred to herein as a wireless device (WD) and/or a subscriber station (SS), and can include an M2M-type device. In one exemplary embodiment, UE 411 is capable of automatically initiating a client-server session in a cloud-based computing environment based on user-defined parameters according to the subject matter disclosed herein. In one exemplary configuration, a single cell of an E-UTRAN access network 402 provides one substantially localized geographical transmission point (having multiple antenna devices) that provides access to one or more UEs. In another exemplary configuration, a single cell of an E-UTRAN access network 402 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there is no centralized controller in E-UTRAN; hence the E-UTRAN architecture is said to be flat. The eNBs are normally interconnected with each other by an interface known as "X2" and to the EPC by an S1 interface. More specifically, an eNB is connected to MME 404 by an S1-MME interface and to SGW 406 by an S1-U interface. The protocols that run between the eNBs and the UEs are generally referred to as the "AS protocols." Details of the various interfaces are well known and not described herein.

The eNB 410 hosts the PHYsical (PHY), Medium Access Control (MAC), Radio Link Control (RLC), and Packet Data Control Protocol (PDCP) layers, which are not shown in FIG. 4, and which include the functionality of user-plane header-compression and encryption. The eNB 410 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DL/UL user plane packet headers.

The RRC layer in eNB 410 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 411, generates pages for UEs 411 over the air, broadcasts system information, controls UE measurement reporting, such as the periodicity of Channel Quality Information (CQI) reports, and allocates cell-level temporary identifiers to active UEs 411. The RRC layer also executes transfer of UE context from a source eNB to a target eNB during handover, and provides integrity protection for RRC messages. Additionally, the RRC layer is responsible for the setting up and maintenance of radio hearers.

Figure 5:
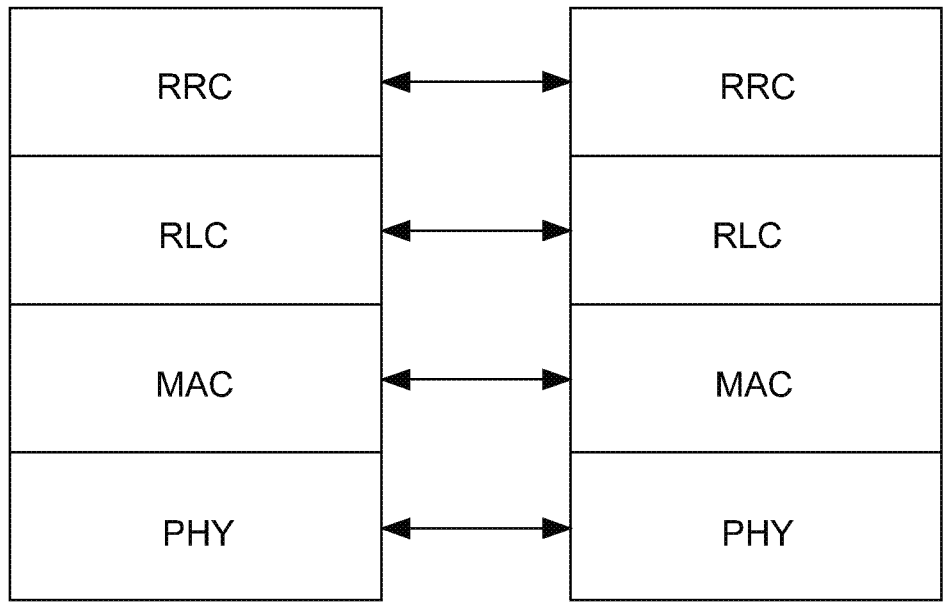
FIGS. 5 and 6 respectively depict exemplary radio interface protocol structures between a UE and an eNodeB that are based on a 3GPP-type radio access network standard and that is capable of automatically initiating a client-server session in a cloud-based computing environment based on user-defined parameters according to the subject matter disclosed herein.
Figure 6:
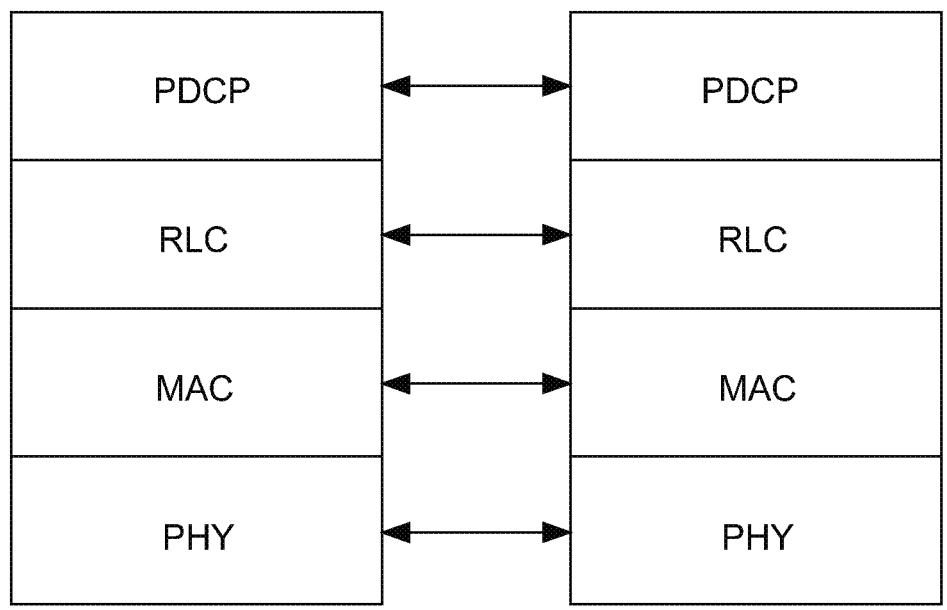

FIGS. 5 and 6 respectively depict exemplary radio interface protocol structures between a UE and an eNodeB that are based on a 3GPP-type radio access network standard and that is capable of automatically initiating a client-server session in a cloud-based computing environment based on user-defined parameters according to the subject matter disclosed herein. More specifically, FIG. 5 depicts individual layers of a radio protocol control plane and FIG. 6 depicts individual layers of a radio protocol user plane. The protocol layers of FIGS. 5 and 6 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets, such as IPv4 or IPv6 packets, in a radio interval with a narrow bandwidth. As a result, only information required for a header part of data can be transmitted, so that transmission efficiency of the radio interval can be increased. In addition, in an LTE-based system, the PDCP layer performs a security function that includes a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the LIE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C-plane, and the DRB is used as a transmission passage of user data in the U-plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HARQ) ACK or NACK Scheduling Request (SR) and Channel Quality Indicator (CQT) report information, received from first and second layers (L1 and L2).

Figure 7:
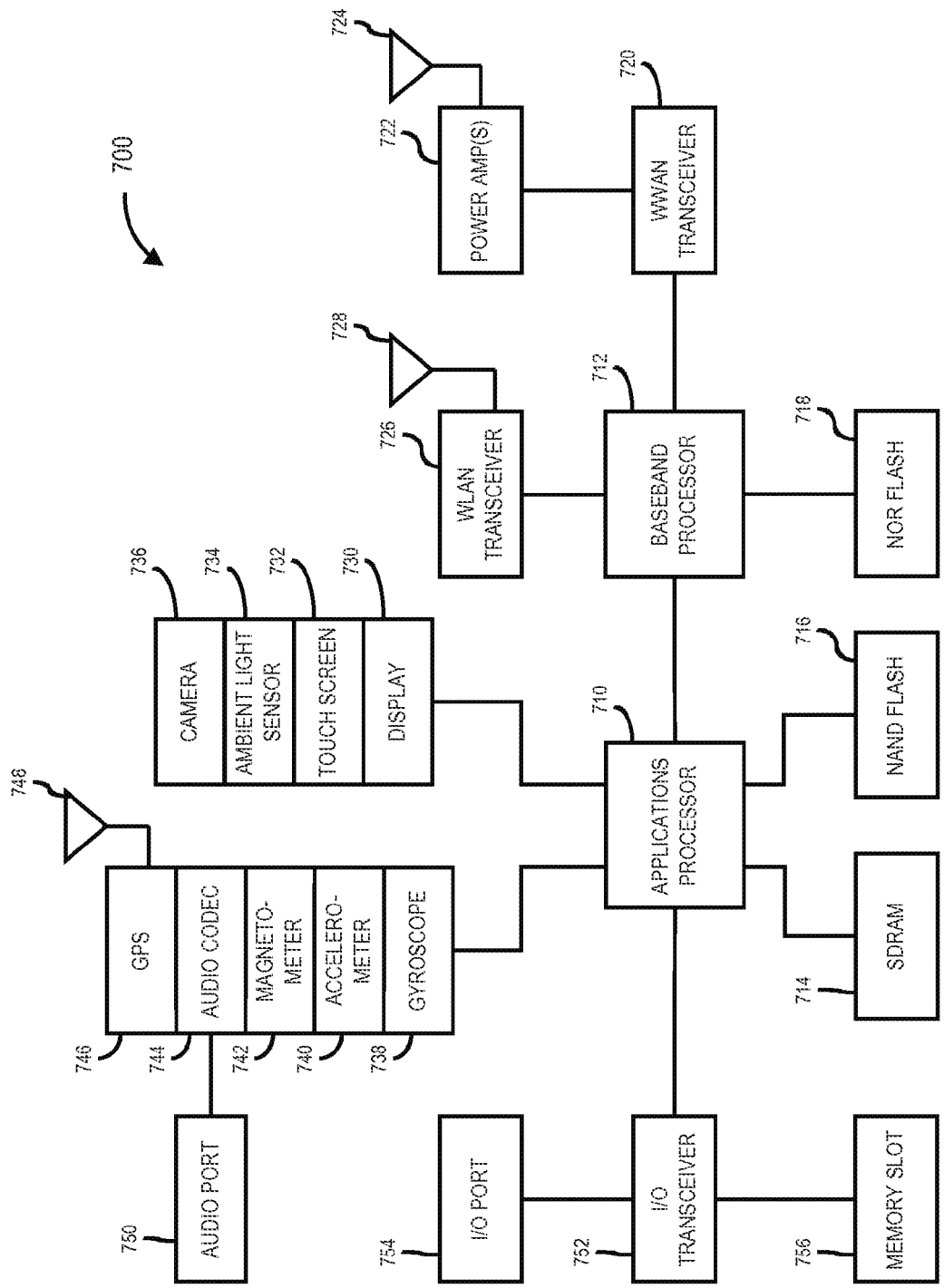
FIG. 7 depicts an exemplary functional block diagram of an information-handling system that is capable of automatically initiating a client-server session in a cloud-based computing environment based on user-defined parameters according to the subject matter disclosed herein.

FIG. 7 depicts an exemplary functional block diagram of an information-handling system 700 that is capable of automatically initiating a client-server session in a cloud-based computing environment based on user-defined parameters according to the subject matter disclosed herein. Information-handling system 700 of FIG. 7 may tangibly embody one or more of any of the exemplary devices, exemplary network elements and/or functional entities of the network as shown in and described with respect to FIG. 1, FIG. 3, and/or core network 401 as shown in and described with respect to FIG. 4. In one exemplary embodiment, information-handling system 700 may represent the components of smart-type device 100, subscriber station 316, CPE 322, base stations 314 and 320, eNB 410, and/or LIE 411, with greater or fewer components depending on the hardware specifications of the particular device or network element. In another exemplary embodiment, information-handling system may provide M2M-type device capability. In yet another exemplary embodiment, information-handling system 700 is capable of automatically initiating a client-server session in a cloud-based computing environment based on user-defined parameters according to the subject matter disclosed herein. Although information-handling system 700 represents one example of several types of computing platforms, information-handling system 700 may include more or fewer elements and/or different arrangements of elements than shown in FIG. 7, and the scope of the claimed subject matter is not limited in these respects.

In one or more embodiments, information-handling system 700 may comprise one or more applications processor 710 and a baseband processor 712. Applications processor 710 may be utilized as a general purpose processor to run applications and the various subsystems for information handling system 700, and to provide automatically initiation of a client-server session in a cloud-based computing environment based on user-defined parameters according to the subject matter disclosed herein. Applications processor 710 may include a single core or alternatively may include multiple processing cores wherein one or more of the cores may comprise a digital signal processor or digital signal processing core. Furthermore, applications processor 710 may include a graphics processor or coprocessor disposed on the same chip, or alternatively a graphics processor coupled to applications processor 710 may comprise a separate, discrete graphics chip. Applications processor 710 may include on-hoard memory, such as cache memory, and further may be coupled to external memory devices such as synchronous dynamic random access memory (SDRAM) 714 for storing and/or executing applications, such as automatically initiating a client-server session in a cloud-based computing environment based on user-defined parameters according to the subject matter disclosed herein, during operation, and NAND flash 716 for storing applications and/or data even when information handling system 700 is powered off.

In one exemplary embodiment, a user-preference database capable of storing user-preference information may be embodied in SDRAM 714 and/or NAND flash 716, in which the user preference information comprises information relating to media-content-type information, media-content-source information, media-content-destination information, user-uploading-preference information, or uplink-network-preference information, or combinations thereof. Further, applications processor 710 may execute computer-readable instructions stored in SDRAM 714 and/or NAND flash 716 that result in generating at least one rule for uploading at least one media-content type to at least one media-content destination, such that the at least one rule identifies at least one condition to be satisfied before uploading the at least one media-content type to the at least one media-content destination and being based on the stored user preference information and at least one calendar event available to the rule generator from at least one calendar application. Further still, based on detected conditions, applications processor 710 may generate an event trigger signal if the at least one condition of the at least one rule has been satisfied. In one exemplary embodiment, the event trigger signal would cause base a band processor 712 to establish a communication link to the at least one designated media-content destination based on uplink-network-preference information stored in the user-preference database, and capable of uploading to the at least one designated media-content destination the at least one media-content type corresponding to the at least one rule.

In one exemplary embodiment, baseband processor 712 may control the broadband radio functions for information-handling system 700. Baseband processor 712 may store code for controlling such broadband radio functions in a NOR flash 718. Baseband processor 712 controls a wireless wide area network (WWAN) transceiver 720 which is used for modulating and/or demodulating broadband network signals, for example, for communicating via a 3GPP LTE network or the like as discussed herein with respect to FIG. 7. The WWAN transceiver 720 couples to one or more power amplifiers 722 that are respectively coupled to one or more antennas 724 for sending and receiving radio-frequency signals via the WWAN broadband network. The baseband processor 712 also may control a wireless local area network (WLAN) transceiver 726 coupled to one or more suitable antennas 728 and that may be capable of communicating via a Bluetooth-based standard, an IEEE 802.11-based standard, an IEEE 802.16-based standard, an IEEE 802.18-based wireless network standard, an LTE-based wireless network standard, a 3GPP-based protocol wireless network, a Third Generation Partnership Project Long Term Evolution (3GPP LTE) based wireless network standard, a 3GPP2 Air Interface Evolution (3GPP2 AIE) based wireless network standard, a UNITS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NEC-based) link, a WiGig-based network, a ZigBee-based network, or the like. It should be noted that these are merely example implementations for applications processor 710 and baseband processor 712, and the scope of the claimed subject matter is not limited in these respects. For example, any one or more of SDRAM 714, NAND flash 716 and/or NOR flash 718 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, applications processor 710 may drive a display 730 for displaying various information or data, and may further receive touch input from a user via a touch screen 732, for example, via a finger or a stylus. In one exemplary embodiment, screen 732 display a menu and/or options to a user that are selectable via a finger and/or a stylus for entering user preference and permission information for storage in UPPP 101 (FIG. 1).

An ambient light sensor 734 may be utilized to detect an amount of ambient light in which information-handling system 700 is operating, for example, to control a brightness or contrast value for display 730 as a function of the intensity of ambient light detected by ambient light sensor 734. One or more cameras 736 may be utilized to capture images that are processed by applications processor 710 and/or at least temporarily stored in NAND flash 716. Furthermore, applications processor may be coupled to a gyroscope 738, accelerometer 740, magnetometer 742, audio coder/decoder (CODEC) 744, and/or global positioning system (GPS) controller 746 coupled to an appropriate GPS antenna 748, for detection of various environmental properties including location, movement, and/or orientation of information handling system 700. Alternatively, controller 746 may comprise a Global Navigation Satellite System (GNSS) controller. Audio CODEC 744 may be coupled to one or more audio ports 750 to provide microphone input and speaker outputs either via internal devices and/or via external devices coupled to information-handling system via the audio ports 750, for example, via a headphone and microphone jack. In addition, applications processor 710 may couple to one or more input/output (I/O) transceivers 752 to couple to one or more I/O ports 754 such as a universal serial bus (USB) port, a high-definition multimedia interface (HDMI) port, a serial port, and so on. Furthermore, one or more of the I/O transceivers 752 may couple to one or more memory slots 756 for optional removable memory, such as secure digital (SD) card or a subscriber identity module (SIM) card, although the scope of the claimed subject matter is not limited in these respects.

Figure 8:
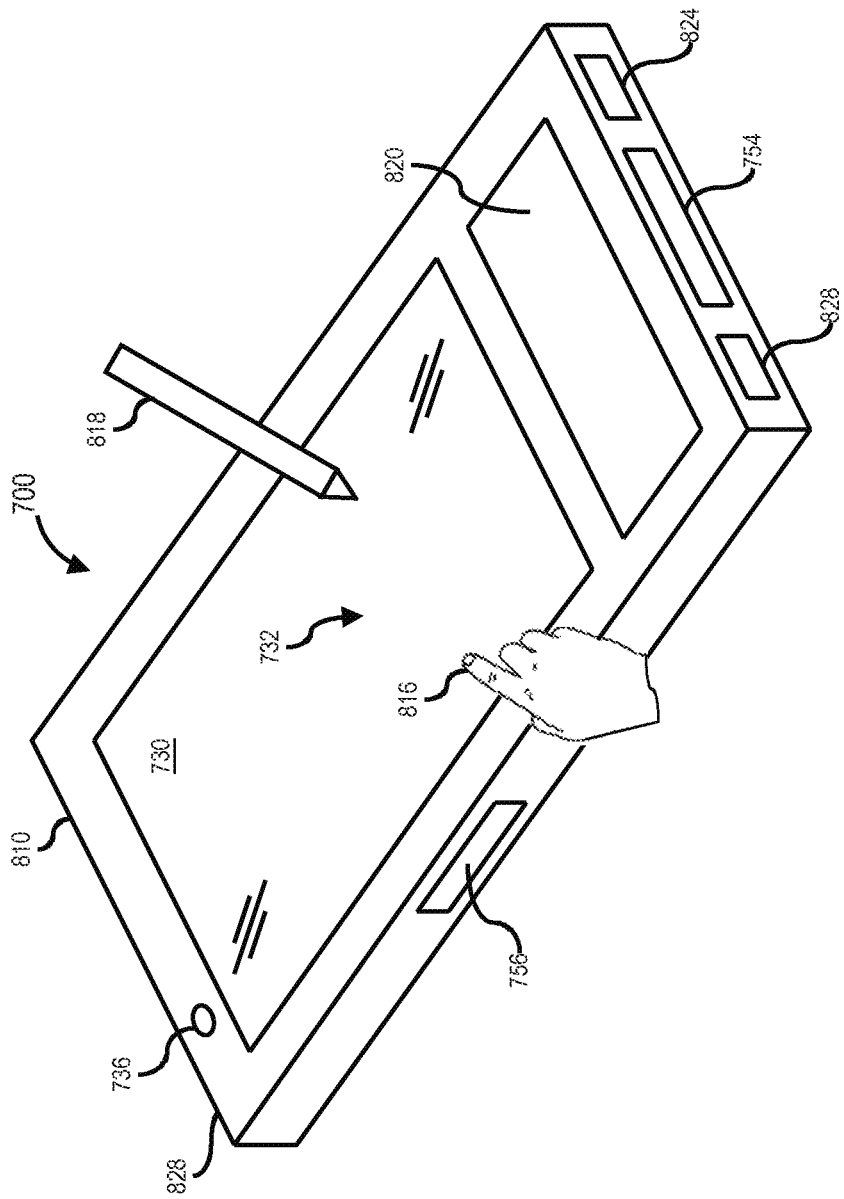
FIG. 8 depicts an isometric view of an exemplary embodiment of the information-handling system of FIG. 7 that optionally may include a touch screen in accordance with one or more embodiments disclosed herein.

FIG. 8 depicts an isometric view of an exemplary embodiment of the information-handling system of FIG. 7 that optionally may include a touch screen in accordance with one or more embodiments disclosed herein. FIG. 8 shows an example implementation of information-handling system 700 of FIG. 7 tangibly embodied as a cellular telephone, smartphone, smart-type device, or tablet-type device or the like, that is capable of automatically initiating a client-server session in a cloud-based computing environment based on user-defined parameters according to the subject matter disclosed herein. In one or more embodiments, the information-handling system 700 may comprise any one of the infrastructure nodes, smart-type device 100, subscriber station 316, CPE 322, mobile station UE 411 of FIG. 4, and/or an M2M-type device, although the scope of the claimed subject matter is not limited in this respect. The information-handling system 700 may comprise a housing 810 having a display 730 that may include a touch screen 732 for receiving tactile input control and commands via a finger 816 of a user and/or a via stylus 818 to control one or more applications processors 710. The housing 810 may house one or more components of information-handling system 700, for example, one or more applications processors 710, one or more of SDRAM 714, NAND flash 716, NOR flash 718, baseband processor 712, and/or WWAN transceiver 720. The information-handling system 700 further may optionally include a physical actuator area 820 which may comprise a keyboard or buttons for controlling information-handling system via one or more buttons or switches. The information-handling system 700 may also include a memory port or slot 756 for receiving non-volatile memory, such as flash memory, for example, in the form of a secure digital (SD) card or a subscriber identity module (SIM) card. Optionally, the information-handling system 700 may further include one or more speakers and/or microphones 824 and a connection port 754 for connecting the information-handling system 700 to another electronic device, dock, display, battery charger, and so on. Additionally, information-handling system 700 may include a headphone or speaker jack 828 and one or more cameras 736 on one or more sides of the housing 810. It should be noted that the information-handling system 700 of FIGS. 7 and 8 may include more or fewer elements than shown, in various arrangements, and the scope of the claimed subject matter is not limited in this respect.

Figure 9:
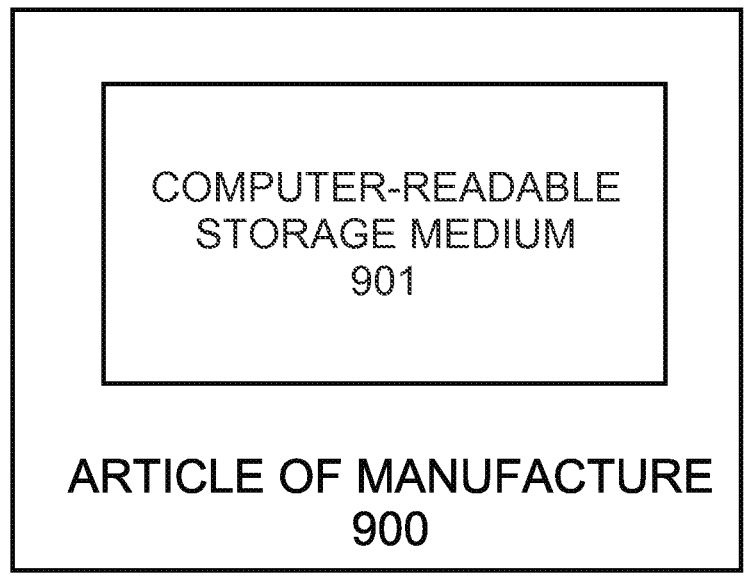
FIG. 9 depicts an exemplary embodiment of an article of manufacture comprising a non-transitory computer-readable storage medium having stored thereon computer-readable instructions that, when executed by a computer-type device, results in any of the various techniques and methods according to the subject matter disclosed herein.

FIG. 9 depicts an exemplary embodiment of an article of manufacture 900 comprising a non-transitory computer-readable storage medium 901 having stored thereon computer-readable instructions that, when executed by a computer-type device, results in any of the various techniques and methods according to the subject matter disclosed herein. Exemplary computer-readable storage mediums that could be used for computer-readable storage medium 901 could be, but are not limited to, a semiconductor-based memory, an optically based memory, a magnetic-based memory, or a combination thereof.

These modifications can be made in light of the above detailed description. The terms used in the following claims should not be construed to limit the scope to the specific embodiments disclosed in the specification and the claims. Rather, the scope of the embodiments disclosed herein is to be determined by the following claims, which are to be construed in accordance with established doctrines of claim interpretation.

The invention claimed is:

1. A mobile station, comprising:
 a user-preference database to store user-preference information;
 a rule generator to generate at least one rule for transferring at least one media-content type to at least one media-content destination, the at least one rule being based on at least one calendar event, wherein the calendar event includes time information and location information for the calendar event and the at least one rule comprises transferring the at least one media-content type to the at least one media-content destination if the at least one media-content is captured by a user during a time corresponding to the time information and at a location corresponding to the location information;
 a Global Positioning System (GPS) device to determine a location of the mobile station, wherein the rule generator is coupled to the GPS device and is further generating the at least one least one rule based on the determined location of the mobile station;
 an event trigger generator, coupled to the rule generator, to generate an event trigger signal if the at least one rule has been satisfied; and
 a communication controller responsive to the event trigger signal and establishing a communication link to the at least one designated media-content destination based on transfer-network-preference information stored in the user-preference database;
 wherein the transfer-network-preference information comprises cost threshold information for selecting an uplink network, a downlink network, or a combination thereof.

2. The mobile station according to claim 1, wherein the communication controller is further controlling transfer of the at least one media-content type to the at least one designated media-content destination.

3. The mobile station according to claim 2, wherein the media-content-type information comprises information relating to photo-based media, video-based media, image-based media, text-based media, or audio-based media, or combinations thereof, wherein the user preference information comprises information relating to media-content-type information, media-content-source information, media-content-destination information, user-uploading-preference information, user-downloading-preference information, or transfer-network-preference information, or combinations thereof; and wherein transferring comprises uploading or downloading, or a combination thereof.

4. The mobile station according to claim 3, wherein the media-content-destination information comprises information relating to at least one cloud-based media-content-sharing server.

5. The mobile station according to claim 3, wherein the media-content-source information comprises information relating to at least one source location that is local to the mobile station, or at least one source location that is remote from the mobile station, or a combination thereof.

6. The mobile station according to claim 1, wherein the at least one calendar application is local to the mobile station, or remote from the mobile station, or a combination thereof.

7. The mobile station according to claim 1, further comprising a touchscreen display to receive user-preference information from a touch of a user or a stylus.

8. The mobile station according to claim 1, wherein the transfer-network-preference information designates a Bluetooth-based network, an IEEE 802.11-based network, an IEEE 802.16-based network, an IEEE 802.18-based wireless network, a 3GPP-based protocol wireless network, a Third Generation Partnership Project Long Term Evolution (3GPP LTE) based wireless network, a 3GPP2 Air Interface Evolution (3GPP2 AIE) based wireless network, a UMTS-based protocol wireless, a CDMA2000-based protocol wireless, a GSM-based protocol wireless, a cellular-digital-packet-data-based (CDPD-based) protocol wireless network, a Mobitex-based protocol wireless network, a Near-Field-Communications-based (NFC-based) link, a WiGig-based network, or a ZigBee-based network, or combinations thereof.

9. A method, comprising:
generating at least one rule for uploading at least one media-content type to at least one cloud-based media-content-sharing server, the at least one rule being based on at least one calendar event, wherein the calendar event includes time information for the calendar event and the at least one rule comprises transferring the at least one media-content type to the at least one cloud-based media-content-sharing server if the at least one media-content is captured by a user during a time corresponding to the time information and at a location corresponding to the location information;
determining a location of a mobile station with which the at least one media-content type is captured via a Global Positioning System (GPS) device, wherein generating the at least one rule further comprises generating the at least one rule based on the determined location of the mobile station;
establishing a communication link from the mobile station to the at least one cloud-based media-content-sharing server based on transfer-network-preference information if the at least one rule has been satisfied;
wherein the transfer-network-preference information comprises cost threshold information for selecting an uplink network, a downlink network, or a combination thereof; and
uploading to the at least one cloud-based media-content-sharing server the at least one media-content type corresponding to the at least one rule.

10. The method according to claim 9, further comprising storing user-preference information in a user-preference database, the user preference information comprising information relating to media-content-type information, media-content-source information, media-content-destination information, user-uploading-preference information, user-downloading-preference information, transfer-network-preference information, or combinations thereof.

11. The method according to claim 10, wherein the user-preference database is part of a mobile station, a central personal cloud device, or a cloud-based server, and
wherein the media-content-source information comprises information relating to at least one source location that is local to the mobile station, or a source location that is remote from the mobile station, or a combination thereof, and
wherein transfer-network-preference information comprises uplink-network-preference information, or downlink-network-preference information, or combinations thereof.

12. The method according to claim 11, wherein the uplink-network-preference information, or the downlink-network-preference information, or a combination thereof, comprises cost threshold information for selecting an uplink network, a downlink network, or a combination thereof.

13. The method according to claim 9, wherein the media-content-type information comprises information relating to photo-based media, video-based media, image-based media, text-based media, or audio-based media, or combinations thereof.

14. The method according to claim 9, wherein the at least one calendar application is local to the mobile station, or remote from the mobile station, or a combination thereof.

15. The method according to claim 9, wherein the mobile station comprises a touchscreen display to receive user-preference information from a touch of a user or a stylus,
the method further comprising receiving user-preference information from a touch of a user or a stylus.

16. The method according to claim 9, wherein the transfer-network-preference information designates a Bluetooth-based network, an IEEE 802.11-based network, an IEEE 802.16-based network, an IEEE 802.18-based wireless network, a 3GPP-based protocol wireless network, a Third Generation Partnership Project Long Term Evolution (3GPP LTE) based wireless network, a 3GPP2 Air Interface Evolution (3GPP2 AIE) based wireless network, a UMTS-based protocol wireless, a CDMA2000-based protocol wireless, a GSM-based protocol wireless, a cellular-digital-packet-data-based (CDPD-based) protocol wireless network, a Mobitex-based protocol wireless network, a Near-Field-Communications-based (NFC-based) link, a WiGig-based network, or a ZigBee-based network, or combinations thereof.

17. An article comprising: a non-transitory computer-readable medium having stored thereon instructions that, if executed, result in at least the following:
receiving user-preference information relating to a mobile station;
storing the user-preference information in a user-preference database;
determining a location of the mobile station with which the at least one media-content type is captured via a Global Positioning System (GPS) device;
processing at least one rule for transferring at least one media-content type to at least one media-content destination, the at least one rule being based on at least one calendar event, wherein the calendar event includes time information and location information for the calendar event and the at least one rule comprises transferring the at least one media-content type to the at least one media-content destination based on a transfer-network-preference information if the at least one media-content is captured by a user during the time information and at the location information;

wherein the transfer-network-preference information comprises cost threshold information for selecting an uplink network, a downlink network, or a combination thereof; and transferring to the at least one media-content destination the at least one media-content type corresponding to the at least one rule.

18. The article according to claim 17, wherein the user preference information comprises information relating to media-content-type information, media-content-source information, media-content-destination information, user-uploading-preference information, user-downloading-preference information, transfer-network-preference information, or combinations thereof.

19. The article according to claim 18, wherein media-content-source information comprises information relating to at least one source location that is local to the user-preference database, or a source location that is remote from the user-preference database, or a combination thereof, and wherein the transfer-network-preference information comprises cost threshold information for selecting an uplink network, a downlink network, or a combination thereof.

20. The article according to claim 17, wherein the media-content-type information comprises information relating to photo-based media, video-based media, image-based media, text-based media, or audio-based media, or combinations thereof, and wherein at least one the media-content-destination information comprises information relating to at least one cloud-based media-content-sharing server.

21. The article according to claim 17, wherein the at least one calendar application is local to the mobiles station, remote from the mobile station, or a combination thereof.

22. The article according to claim 17, wherein receiving the user-preference information comprises receiving the user-preference information through a touchscreen display of the mobile station by a touch of a user or a stylus.

23. The article according to claim 17, wherein the transfer-network-preference information designates a Bluetooth-based network, an IEEE 802.11-based network, an IEEE 802.16-based network, an IEEE 802.18-based wireless network, a 3GPP-based protocol wireless network, a Third Generation Partnership Project Long Term Evolution (3GPP LTE) based wireless network, a 3GPP2 Air Interface Evolution (3GPP2 AIE) based wireless network, a UMTS-based protocol wireless, a CDMA2000-based protocol wireless, a GSM-based protocol wireless, a cellular-digital-packet-data-based (CDPD-based) protocol wireless network, a Mobitex-based protocol wireless network, a Near-Field-Communications-based (NFC-based) link, a WiGig-based network, or a ZigBee-based network, or combinations thereof.

24. A server device, comprising:
a memory to store user-preference information;
a trigger generating device of generating a trigger event signal if at least one rule is determined to be satisfied, the at least one rule being based on the stored user-preference information and at least one calendar event, wherein the calendar event includes time information and location information regarding the calendar event and the at least one rule comprises executing the trigger event if the at least one rule is satisfied for the time information and the location information;
a location determining device to determine a Global Positioning System (GPS) location of a client device, wherein the trigger generating device is coupled to the location determining device and is further generating the at least one least one rule based on the determined location of the client device; and
a communication controller responsive to the event trigger signal and to establish a communication link to the at least one designated media-content destination based on transfer-network-preference information stored in the user-preference database;
wherein the transfer-network-preference information comprises cost threshold information for selecting an uplink network, a downlink network, or a combination thereof.

25. The server device according to claim 24, wherein the client device comprises a touchscreen display to receive user-preference information from a touch of a user or a stylus.

26. The server device according to claim 24, wherein the transfer-network-preference information designates a Bluetooth-based network, an IEEE 802.11-based network, an IEEE 802.16-based network, an IEEE 802.18-based wireless network, a 3GPP-based protocol wireless network, a Third Generation Partnership Project Long Term Evolution (3GPP LTE) based wireless network, a 3GPP2 Air Interface Evolution (3GPP2 AIE) based wireless network, a UMTS-based protocol wireless, a CDMA2000-based protocol wireless, a GSM-based protocol wireless, a cellular-digital-packet-data-based (CDPD-based) protocol wireless network, a Mobitex-based protocol wireless network, a Near-Field-Communications-based (NFC-based) link, a WiGig-based network, or a ZigBee-based network, or combinations thereof.

\* \* \* \* \*